United States Patent [19]
Glaze

[11] 3,808,948
[45] May 7, 1974

[54] ELECTRO HYDRAULIC ACTUATOR ARRANGEMENT

[75] Inventor: Stanley George Glaze, Kingswinford, England

[73] Assignee: Lucas Aerospace Limited, Birmingham, England

[22] Filed: Nov. 13, 1972

[21] Appl. No.: 306,333

[30] Foreign Application Priority Data
Nov. 13, 1971 Great Britain............... 52818/71

[52] U.S. Cl.............. 91/363 A, 91/441, 91/445, 91/461
[51] Int. Cl............. F15b 9/03, F15b 9/09
[58] Field of Search....... 91/363 A, 445, 363 R, 360

[56] References Cited
UNITED STATES PATENTS
2,976,848  3/1961  Place ................... 91/445

3,426,650  2/1969  Jenny ................. 91/363 A
3,505,929  4/1970  Coppola et al. ........ 91/363 A
3,724,330  4/1973  Mason ................ 91/363 A

*Primary Examiner*—Paul E. Maslousky
*Attorney, Agent, or Firm*—Holman & Stern

[57] ABSTRACT

An electro-hydraulic actuator arrangement includes a fluid pressure operated actuator, an electrically operated servo valve to supply fluid pressures to the actuator and a lock valve operable to isolate the actuator and thereby to "lock " the latter. A comparator compares two nominally identical control signals and provides a signal to operate the lock valve when the difference between the control signals exceeds a predetermined value.

12 Claims, 4 Drawing Figures

ELECTRO HYDRAULIC ACTUATOR ARRANGEMENT

This invention relates to electro-hydraulic actuator arrangements.

According to the invention an electro-hydraulic actuator arrangement responsive to electrical input control signals comprises a hydraulic actuator, means responsive to the position of said actuator to provide a first electrical signal, means for providing a second electrical signal when the difference between a pair of nominally identical input control signals exceeds a predetermined value, means for modifying one of said input control signals in accordance with the magnitude of said first signal, a servo control valve responsive to said modified signal to apply an operating pressure from a fluid pressure source to said actuator, a servocontrolled lock valve operable to isolate said hydraulic actuator, means responsive to said one control signal to generate a third electrical signal proportional to a calculated position of said actuator in response to said modified signal, means for providing a fourth electrical signal when the difference between said first and third electrical signals exceeds a predetermined value, and means responsive to the sum of said second and fourth signals to cause said lock valve to isolate the actuator.

An actuator arrangement according to the invention will now be described by way of example and with reference to the accompanying drawings, in which.

Figure 1:
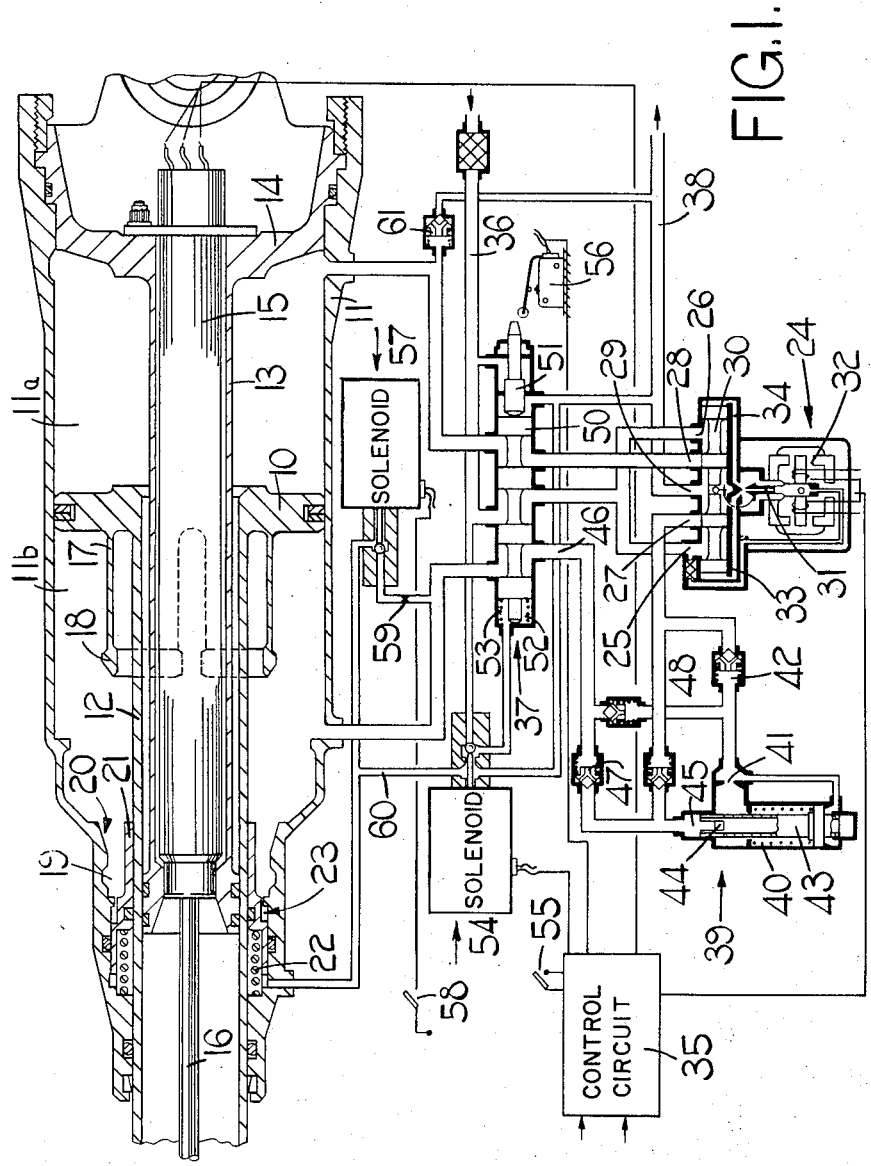
FIG. 1 is a diagram of the actuator arrangement.

A piston 10 is slidable in a cylinder 11 and has a tubular stem 12 which provides the actuator output. A spigot 13 extends from an end wall 14 of cylinder 11 and is sealingly slidable within the stem 12. Spigot 13 encloses a single track potentiometer 15 which serves as a linear displacement transducer to provide a first electrical signal dependent on the position of piston 10, and has an input rod 16 secured to the stem 12 at the end thereof remote from the head of piston 10.

Piston 10 also includes axially extending spring fingers 17 having projections 18 which are engageable in complementary recesses 19 in the wall of cylinder 11. Adjacent recesses 19 is a ramp 20 which deflects fingers 17 inwards as the piston 10 moves left, as seen in the drawing, whereby projections 18 enter recesses 19 with a spring action. Slidably and sealingly engaging both cylinder 11 and stem 12 is a sleeve 21. A spring 22 biases sleeve 21 towards engagement with a stop in which position a circumferential face 23 on sleeve 21 can engage the inner face on projections 18 to prevent the latter from moving out of recesses 19. During leftward movement of piston 10 the inward displacement by ramp 20 of fingers 17 enables the latter to engage sleeve 21 and move it against spring 22, sleeve 21 subsequently moving right to latch the fingers in position in recesses 19.

An electrically operated servo control valve 24 has a pair of inlet ports 25, 26 a pair of outlet ports 27, 28 and an exhaust port 29. Associated with the ports 25, 26, 27, 28 is a valve spool 30 axially movable in response to pressure signals at its opposite ends between positions in which ports 25, 27 and ports 28, 29 intercommunicate and further positions in which ports 26, 28 and ports 27, 29 intercommunicate. The pressure signals at the respective ends of spool 30 are derived from the pressure at port 25 via a nozzle 31 pivotally movable by a torque motor 32 so as to be aligned with either of a pair of passages 33, 34 through which the pressure signals are conveyed to the ends of spool 30. Torque motor 32 is responsive to electrical signals from a control circuit, shown generally at 35. Circuit 35 receives an input from potentiometer 15, this input acting to modify the electrical signals supplied to torque motor 32.

Ports 25, 26 communicate with a high pressure fluid supply line 36 via a servo controlled lock valve 37 later to be described. Port 29 communicates with a return line 38, port 28 communicates with a chamber 11a of cylinder 11 via lock valve 37 and port 27 communicates with a chamber 11b of cylinder 11 via lock valve 37 and via a flow limiting arrangement 39. Arrangement 39 includes a valve 40 having an inlet formed by a restricted orifice 41 which communicates via a non-return valve 42 with port 27. A piston control element 43 is movable against a spring 46 by the pressure drop across orifice 41 and defines a variable flow restrictor 44. Outlet 45 of valve 40 communicates with a port 46 of lock valve 37 via a non-return valve 47 and with port 27 via a non-return valve 48. Port 46 of valve 37 also communicates with inlet 41 via a non-return valve 49.

Lock valve 37 has a valve spool 50 biased in a direction to open all the ports of valve 37 by a piston 51 subjected to the pressure in supply line 36. Spool 50 is biased in the opposite direction by a spring 52 and also by the pressure in line 36 which is admitted to a chamber 53 when a solenoid valve 54 is de-energised. Valve 54 is operated by electrical signals supplied from circuit 35. In the energised condition of valve 54, as shown in the drawing, chamber 52 communicates with return line 38, whereupon a fluid pressure on piston 51 can overcome spring 53 to move spool 52 to the position shown. In this position lock valve 37 does not prevent flow to and from cylinder 11. A micro-switch 56 is operable by spool 50, when valve 37 is in its shut-off state, to deenergise valve 54 via circuit 35. A switch 55 effectively by-passes switch 56 to energise valve 54 when required.

A further solenoid valve 57 is energisable by means of a switch 58 to allow chamber 11b of cylinder 11 to communicate via a restrictor 59 and passage 60 with the return line 38. Return line 38 also communicates with chamber 11a via a non-return valve 61.

Figure 2:
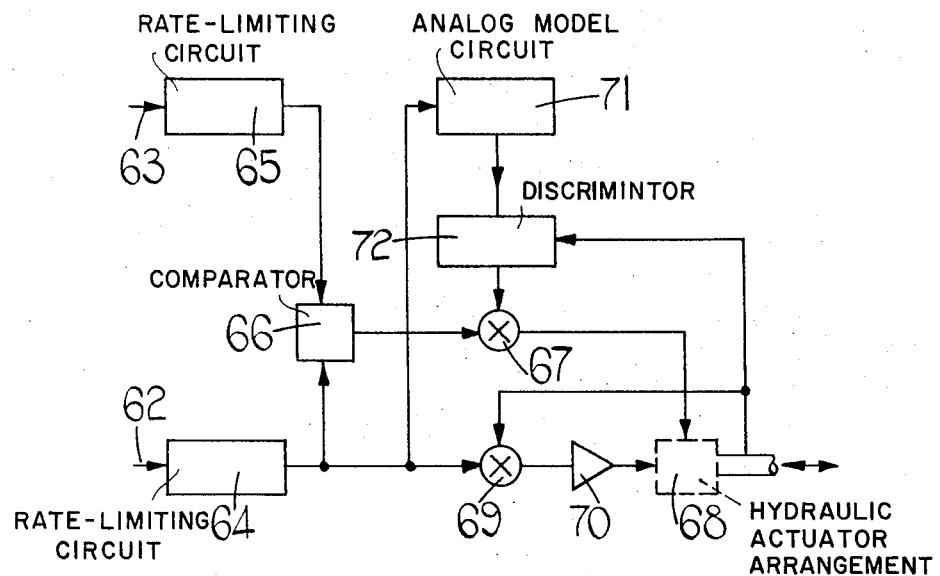
FIG. 2 is a block diagram of a control circuit forming part of the arrangement of FIG. 1, and FIGS. 3 and 4 are block diagrams of alternative forms of control circuit.

A block diagram of the actuator arrangement and of the associated control circuit 35 is shown in FIG. 2. Nominally identical electrical input control signals are supplied on a pair of lines 62, 63 to respective rate-limiting circuits 64, 65. Circuit 64 limits the rate of change of the input control signal which ultimately passes to the actuator, and circuit 65 is a reference or "model" rate limiting circuit whose output is compared with that of circuit 64 in a comparator circuit 66. Circuit 66 provides a second electrical output signal if the disparity between the outputs of circuits 64, 65 exceeds 0.5 percent of the permitted maximum output of these circuits. The second electrical output signal from circuit 66 is supplied via a summing junction 67 to the actuator arrangement, shown generally at 68, to de-energise valve 54.

The output of rate-limiting circuit 64 is supplied via a summing junction 69 and a variable gain amplifier 70 to the torque motor 32 of servo-valve 24, the first electrical signal from potentiometer 15 being fed back to junction 69 to provide a closed control loop for arrangement 68. The input control signal supplied via circuit 64 is also supplied to a circuit 71 which provides a third electrical signal which is an analog model of the actuator arrangement 68. The third electrical signal from the analog model circuit 71 and the first electrical signal from potentiometer 15 are compared in a discriminator circuit, 72. The loop gain of actuator 68 is dependent, inter alia, on the pressure drop across the control valve 24, and this pressure drop is, in turn, dependent on the magnitude and direction of the external load on the piston 10. The time constant of the actuator 68, varies with its loop gain, and the time constant of the analog model circuit 71 is arranged to be midway between the anticipated extreme values of the time constant of actuator 68. Circuit 72 is effectively a switching circuit which supplies a fourth electrical signal to junction 67 when the disparity between the first electrical signal from the actuator arrangement 68 and the third electrical signal from analog model 71 exceeds a predetermined value. The switching level of circuit 72 is arranged to accommodate disparities between the time constants of the actuator 68 and the analog model 71. The output signal from junction 67 acts, as before, to de-energise valve 54.

The actuator arrangement of the invention is particularly adapted for use in positioning the air intake ramps of an aircraft gas turbine engine.

In use, with valve 54 energised, pressure in line 36 urges spool 50 against spring 52 to the position shown. In this condition of valve 37 fluid pressure is admitted to ports 25, 26 of valve 24, and there is a flow through nozzle 31. Energisation of torque motor 32 to move nozzle 31 clockwise from the central position shown urges spool 30 to the left. The supply pressure thus passes via port 28 and lock valve 37 to chamber 11a of cylinder 11. The pressure in chamber 11b escapes to the return line 38 via lock valve 37, valves 48, 49, 40 and ports 27, 29 of valve 24. Piston 10 thus moves to the left until a feed-back signal from potentiometer 15 indicates, via circuit 35, that the engine intake ramps have reached a required position.

At the full extent of its leftward travel piston 10 is latched by engagement of fingers 17 in recesses 19. Sleeve 21 move under the influence of spring 22 to retain fingers 17 in position, pressure in chamber 11b being that of return line 38.

If, in the latched position of piston 10, nozzle 31 is moved anticlockwise by torque motor 32 a fluid pressure signal is applied via port 27, valves 42, 40, 47 and lock valve 37 to chamber 11b. This pressure simultaneously urges sleeve 21 to the left and piston 10 to the right. Piston 10 unlatches and moves to a position determined by circuit 35.

Removal of supply pressure from line 36 causes spool 50 to move under the influence of spring 53 to shut all the ports of valve 37. Fluid is locked within the cylinder chambers 11a, 11b maintaining piston 10 in the position at which supply pressure was removed. The servo control valve 24 is also isolated from line 36. Operation of switch 56 by valve 37 de-energises solenoid valve 54, whereby on restoration of supply pressure, this pressure is applied to chamber 52, maintaining valve 37 in its shut-off position. This condition obtains until switch 56 is over-ridden and switch 55 is made, as a result of manual operation of circuit 35. Lock valve 37 operates to "freeze" piston 10 when supply pressure ceases, either during shut-down or as a result of failure.

Failure of circuit 35 causes solenoid valve 54 to be de-energised and valve 37 thus to assume its shut position.

Aerodynamic loads on the associated engine intake ramps tend to urge the piston 10 to the left. If, therefore, with valve 37 shut, valve 57 is energised by switch 58, chamber 11b exhausts to return line 38 and piston 10 moves to the left at a speed which is limited by restrictor 59. Fluid enters chamber 11a via non-return valve 61, thereby preventing cavitation. Piston 10 can be arrested after a required amount of leftward movement by de-energising valve 57.

Figure 3:
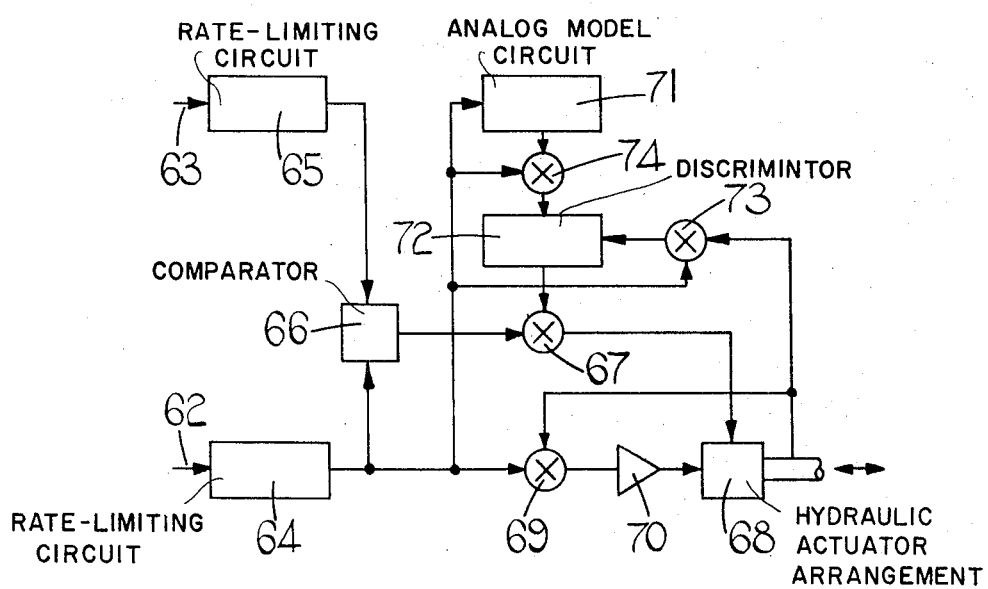

The alternative form of control circuit shown in FIG. 3 is generally similar to that of FIG. 2, identical components having corresponding numbers. The circuit of FIG. 3 includes, however, additional summing junctions 73, 74. Junction 73 provides an output signal dependent on the difference between the outputs of actuator arrangement 68 and circuit 64. Junction 74 provides an output signal dependent on the difference between the outputs of circuits 64, 71. Both inputs to circuit 72 are thereby compared with the output of circuit 64. Errors due to malfunction of circuit 71 or of potentiometer 15 are thereby monitored.

Figure 4:
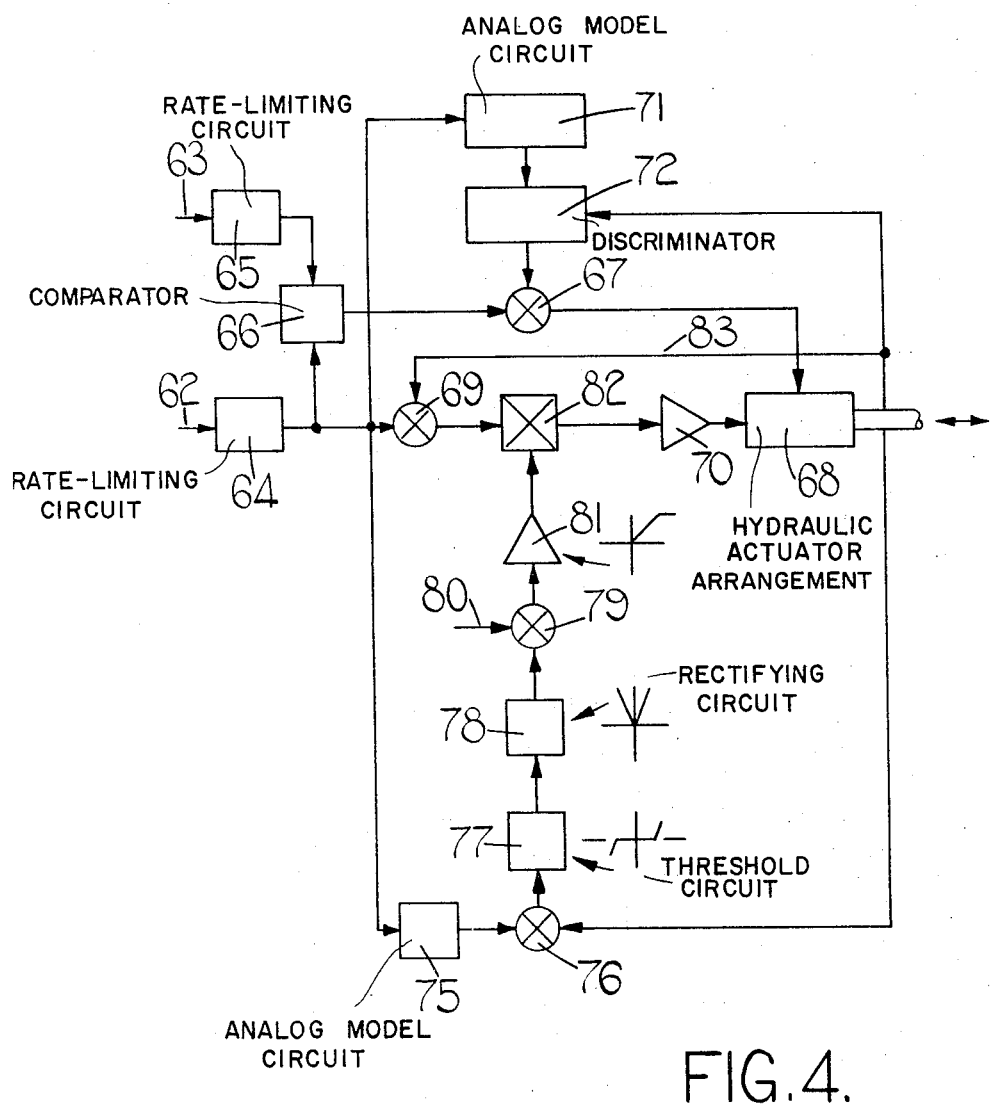

Reduction of differences between the time constants of the actuator 68 and the analog model circuit 71, referred to above, may be achieved by increasing the size of the piston and cylinder arrangement 10, 11. The control circuit shown in FIG. 4 provides an alternative solution. The circuit of FIG. 4 is also based on that shown in FIG. 2, identical components being, once again, given corresponding numbers. A further analog model circuit 75 is responsive to the output of circuit 64 to provide a sixth electrical signal which is an analog model of actuator arrangement 68.

The sixth electrical signal from circuit 75 provides one input of a summing junction 76 whose other input is provided from potentiometer 15. The output of junction 76 is thus proportional to the difference between the actual and model positions of the actuator arrangement 68, and is supplied to a threshold circuit 77 having a dead zone whereby circuit 77 has no output unless the signal from junction 76 exceeds a predetermined value in either sense. Output signals from circuit 77 due to component errors are thus avoided. A rectifying circuit 78 provides an output signal which is the modulus of the output signal from circuit 77. The output of circuit 78 is connected to a summing junction 79 whose other input is provided by a line 80 to which is applied an eighth electrical signal in the form of a constant reference voltage. The output signal from junction 79 is the sum of its two input signals. The voltage on line 80 thus provides a signal which defines a further lower, threshold level.

An amplifier 81 receives the output signal from junction 80 and itself provides a seventh electrical signal which forms one input signal for a multiplying junction 82, whose other input is provided from junction 69.

Amplifier 81 has a gain characteristic as shown, whereby the output of amplifier 81 is limited in the event that the output signal from circuit 75 differs greatly from that derived from potentiometer 15. The output from amplifier 82 is supplied to amplifier 70, to control the actuator 68, as before. The gain of amplifier 70 is thus changed in response to a signal dependent on the difference in the outputs of potentiometer 15 and the analog model circuit 75. The gain of the loop indicated at 83, is arranged by adjustment of the signal on line 80, to have a minimum value which is less than the gain of the loop which includes circuit 75. The time constant of actuator 68 is thus always greater than that of circuit 75, whatever the magnitude and direction of an external load on piston 10. Signals at junction 76 will in this case always have the same sense, and act to increase the gain of loop 83. Loop 83 is thus self-adaptive to changes in the time constant of actuator 68 due to changes in load thereon. The switching level of circuit 72 may thereby be reduced from that required in the arrangement of FIG. 2.

The arrangement described with reference to FIG. 4 has the disadvantage that it is necessary to forecast the magnitude of the greatest external load on piston 10, and hence the minimum gain of loop 83. The gain of loop 83 is itself liable to variation as a result of component errors, even when the actuator 68 is at rest. With an assisting external load on piston 10, this error variation could cause the gain of loop 83 to exceed that of the loop which includes model circuit 75. The position of actuator 68 would in this condition be ahead of that indicated by circuit 75, in which case the gain of amplifier 70 would be altered in the direction to increase the error.

This difficulty can be avoided if the circuit of FIG. 4 is used in a different manner whereby the gain of loop 83 is set by the signal on line 30 so as to have a median value which approximates to that of the loop gain of circuit 75. The upper and lower values of the gain of loop 83 in response to external loads will thus be respectively above and below the loop gain of circuit 75. The signal applied from amplifier 81 to junction 82 is proportional to the magnitude of the error signal from junction 76 and is multiplied by the sign of the error from junction 69.

I claim:

1. An electro-hydraulic actuator arrangement responsive to electrical input control signals, comprising a hydraulic actuator means responsive to the position of said actuator, to provide a first electrical signal, means for providing a second electrical signal when the difference between a pair of nominally identical input control signals exceeds a predetermined value, means for modifying one of said input control signals in accordance with the magnitude of said first signal, a servo control valve responsive to said modified signal to apply an operating pressure from a fluid pressure source to said actuator, a servo-controlled lock valve operable to isolate said hydraulic actuator from said fluid pressure source, means responsive to said one control signal to generate a third electrical signal proportional to a calculated position of said actuator in response to said modified signal, means for providing a fourth electrical signal when the difference between said first and third electrical signals exceeds a predetermined value, and means responsive to the sum of said second and fourth signals to cause said lock valve to isolate the actuator.

2. An arrangement as claimed in claim 1 in which the means responsive to the sum of said second and fourth control signals comprises a valve operable to supply a servo pressure signal to said lock valve.

3. An arrangement as claimed in claim 2 in which said lock valve includes a valve spool movable in response to said servo pressure signal to isolate said servo control valve from said fluid pressure source.

4. An arrangement as claimed in claim 1 in which the means for generating said first electrical signal comprises an electrical potentiometer having relatively movable parts respectively secured to relatively movable portion of said actuator.

5. An arrangement as claimed in claim 4 in which said means for modifying said one input control signal comprises second summing means responsive to an output signal from said potentiometer and to said one input control signal.

6. An arrangement as claimed in claim 1 in which said means for generating said third electrical signals comprises an analog signal generating circuit and means for comparing said one input control signal with an output signal from said analog circuit.

7. An arrangement as claimed in claim 1 in which the means for modifying said one input control signal comprises third summing means responsive to said one signal and to said first electrical signal to provide a fifth electrical signal, and an amplifier responsive to said fifth electrical signal to generate said modified signal.

8. An arrangement as claimed in claim 7 which includes a further means responsive to said one control signal to generate a sixth electrical signal proportional to a calculated position of said actuator in response to said modified signal, and said signal modifying means further comprises a multiplying junction responsive to said fifth electrical signal and to a seventh electrical signal which is dependent on the difference between said sixth electrical signal and said first electrical signal.

9. An arrangement as claimed in claim 8 which includes means for generating said seventh electrical signal, comprising a second summing junction responsive to said first and sixth electrical signals, and a threshold circuit for providing a signal when an output signal from said second summing junction exceeds a predetermined value in either sense.

10. An arrangement as claimed in claim 9 which includes rectifying means for providing an output signal which is proportional to the modulus of an output signal from said threshold circuit.

11. An arrangement as claimed in claim 10 which includes a fourth summing means responsive to an output signal from said rectifying means and to an eighth electrical signal, said eighth signal having a predetermined value, so that an output signal from said fourth summing means has a minimum value.

12. An apparatus as claimed in claim 11 which includes an amplifier responsive to an output signal from said fourth summing means to generate said seventh electrical signal.

* * * * *